Oct. 23, 1923.
J. T. HANNA
1,471,460
PROCESS OF TREATING MILK OR CREAM
Filed Feb. 9, 1922
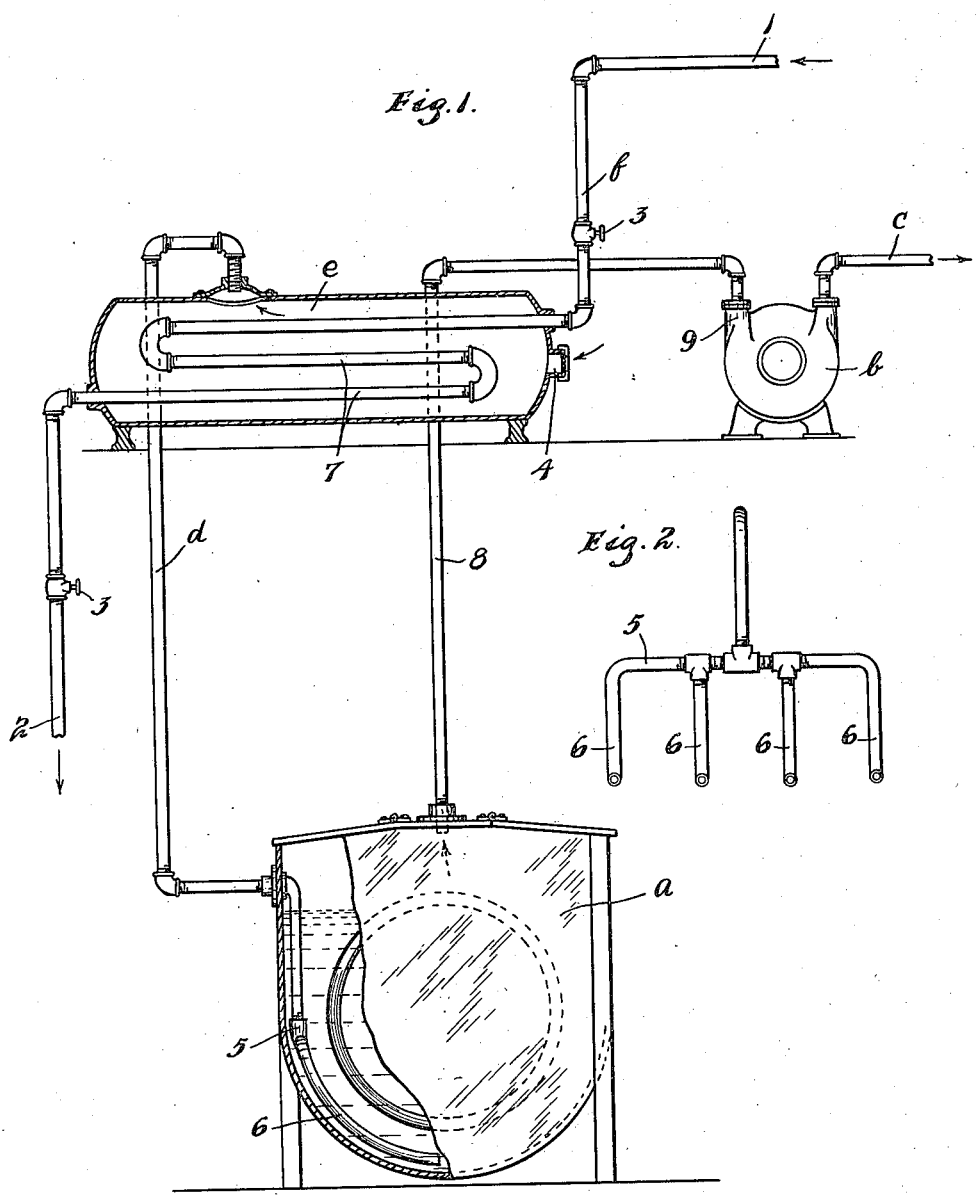
INVENTOR.
JOHN T. HANNA.
BY HIS ATTORNEY.
James F. Williamson Patented Oct. 23, 1923.

1,471,460

UNITED STATES PATENT OFFICE.

JOHN T. HANNA, OF HUDSON, WISCONSIN.

PROCESS OF TREATING MILK OR CREAM.

Application filed February 9, 1922. Serial No. 535,376.

*To all whom it may concern:*

Be it known that I, JOHN T. HANNA, a citizen of the United States, residing at Hudson, in the county of Saint Croix and State of Wisconsin, have invented certain new and useful Improvements in Processes of Treating Milk or Cream; and I do hereby declare the following to be a full, clear, and exact description of the invention, such as will enable others skilled in the art to which it appertains to make and use the same.

This invention relates to a method of treating cream or milk. Under the usual practice in the organization of the cream and butter industry, the cream is delivered by the dairymen to the creamery and this cream has now, in most cases, been separated from the milk by the well known cream separator.

The milk, immediately after being drawn from the cow, is subject to contamination. Oftentimes the flavors of feeds fed the cow are passed on through in the milk and carried clear through the process of butter manufacture, and come out and show very pronouncedly in the finished product. Furthermore, the cream, before being brought to the creamery or butter-working establishment, often stands about barns or dairy houses and thus absorbs foreign and objectionable odors. Some dairymen are careless about keeping the cans in sanitary condition and these cans acquire a sour and foul odor which is communicated to the cream. The odor of the cow barns and the odor of silage are also absorbed by the cream. Furthermore, the cream is brought to the creamery at different periods after being separated, so that the product received is in no way uniform.

It is an object of the present invention to treat the widely varying samples of cream received, which cream contains many objectionable odors, so that a uniform product will be produced, free from foreign and objectionable matter and odors, and to still maintain the butter in as natural a state as possible.

More specifically, it is an object of this invention to treat the cream by heating the same to a moderate temperature in a cream ripener, and thereafter passing air heated to a much higher temperature than the cream, therethrough.

These and other objects and advantages of the invention will be fully apparent from the following description made in connection with the accompanying drawings which represent, more or less, diagrammatically, the apparatus used in carrying out the process, and in which Fig. 1 is a view in general of the apparatus in elevation; and Fig. 2 is a view in front elevation of the air discharging apparatus.

The cream received at the creamery is placed in the container $a$. This container is of the usual type of cream ripener which comprises a closed vessel having a heating coil therein. In this container, the cream is heated to what is commonly known as "blood heat" which is a temperature approximately the same or slightly above the temperature of the milk at the time the same is milked from the cow. After the cream has been heated for a short time and has attained a uniform temperature throughout, heated air is blown or drawn through the same. In the apparatus illustrated, the air is heated in a closed casing or vessel $e$ in which are located a plurality of heated steam coils 7 supplied through a pipe $f$ which will be connected to some suitable steam supply pipe 1. An exhaust pipe 2 is also shown as connected to the coil 7 to carry the steam therefrom. The supply and pressure of steam can be regulated by means of valves 3 disposed in the pipes 2 and $f$. The interior of the vessel $e$ communicates with the cream ripener $a$ through a pipe $d$ and this pipe has connected thereto a cross pipe 5 from which project a plurality of semi-circular pipes 6 having open ends terminating at spaced points adjacent the bottom of the vessel $a$ and approximately at the central line thereof. The air is drawn from the vessel $a$ through a pipe 8 which communicates with the intake 9 of a suction fan $b$, the outlet of which is shown at $c$. By means of the fan $b$, a partial vacuum is maintained in the top of the vessel $a$ and heated air is thus drawn through the pipe $e$ and through the pipe 6, which air bubbles up through the cream and aerates the same. A screen 4 is placed at the end of the vessel $e$ through which the air enters said vessel. This screen may be of such nature that the air enters said vessel. This screen may be of such nature that the air will be properly screened and, if desirable, may comprise a chemical filter. The air used will be heated to a considerably higher temperature than the temperature to which the cream is raised and will be, preferably, in the neighborhood of 150 degrees F. The cream, on the other hand, will only be heated to a temperature varying from 60 to 110 degrees F. The air passing through the cream does not materially raise the temperature thereof. In one test, the air was passed through the cream for a period of twenty minutes and the temperature of the cream had only been raised two degrees. Normally, of course, the air is not passed through for any such a long period.

By the use of the present process, neutralizing agents, such as lime water, alkali, alkali washing powders and other chemicals of like nature are not needed to purify the cream. The use of chemicals is undesirable and the successful treatment of cream without the use thereof is quite a step in advance in the art.

The process is equally applicable to either sweet or sour cream. A great deal of the cream comes to the creamery sour and is commonly known as acid cream. The treatment of this cream without the use of chemicals is, I believe, broadly novel.

The precise action of the air on the cream is not altogether understood but it is believed that the air acts on the foreign matters and solids in the cream rather than upon the liquid portions thereof. It has heretofore been the universal opinion of cream and dairy experts that a high acid cream was decomposed cream and that the acid itself was the objectionable feature. I believe that the objectionable feature is only the result of contamination and my experiments and results with the present process have shown that the acidity of the cream, as obtained by the acidity tests, has very little influence on the product made therefrom. Cream having 6% acid is a very high acid cream and will be very sour. After treatment by my process, this cream will still, according to the acidity test, show an acid content of approximately 5½% and yet the cream will taste sweet and fresh. It has also heretofore been thought that the butter fat in a high acid cream was spoiled. By the use of the present process, however, butter fat is utilized the same and is as desirable in quality as in sweet cream.

It is the customary practice to add lactic acid culture to the cream before churning the same. In making butter from the cream treated by my process, this culture is also added in the usual proportions of about 10% of the quantity of the cream. With cream treated according to the present process, this culture gives a very pronounced result in a very short time. In fifteen or twenty minutes the cream will have a pronounced taste of the culture, a result which, in untreated cream, would take ten or twelve hours.

Buttermilk made from churning the cream treated by this process is of superior and excellent flavor and will retain its flavor much longer than buttermilk from cream which has not been treated. The taste of buttermilk begins to change and deteriorate from the moment it is taken from the churn, but buttermilk from cream treated according to the present process can be left standing for several days without a disagreeable or noticeable change in its taste or flavor.

It may be stated that the variation in the temperature to which the cream is raised before the air treatment, varies somewhat according to the product to be made therefrom. If the butter is to be placed in storage for a considerable time, a higher temperature will be used and a longer period of air treatment given, while lower temperatures and shorter treatment will be given if the butter is to be marketed in a short time.

This process will result in a more uniform standard of butter and in more uniform storage temperatures and conditions.

The cost of treating cream according to this process is slightly greater than if the cream is churned untreated. The cost of so treating the cream is however only about one-tenth of the cost of the regular pasteurization treatment.

Butter made from the cream treated in accordance with this process is of the highest grade, regardless of the condition of the cream received at the creamery and this butter will remain sweet and in first class condition for a long period.

As above stated, the precise action of the air on the cream is not altogether understood, but it is apparent that the bacteria which acts to give the butter a rancid taste are either largely destroyed, rendered harmless, or removed. The cream is also so acted upon by the air that the objectionable odors carried thereby are effectively removed. While the cream is usually brought to a "blood heat" temperature, or a temperature approximately 90 degrees F. before the air treatment is given, this temperature can be varied from approximately 60 to 110 degrees F. with effective results. It may be stated that the cream is usually heated until a slight vapor is seen to rise therefrom. This occurs, of course, at approximately the temperatures indicated.

Millions of dollars have been spent in attempting to produce a process by which sour cream can be effectively treated. After long experiments and with great expense, I believe I have solved this problem.

It will, of course, be understood that various changes and modifications may be made in the temperture, duration of treatment and arrangement of the apparatus without departing from the scope of applicant's invention, which, generally stated, consists in the matter shown and described and set forth in the appended claims.

What is claimed is:

1. The process of treating milk or cream which consists in heating the cream to bring the same to a uniform temperature of between sixty degrees F. and one hundred and ten degrees F. and then passing air through the same, which air has been primarily heated to a temperture of at least one hundred and fifty degrees F.

2. The process of treating milk or cream which consists in heating the cream for a short period to bring the same to a uniform temperature between sixty degrees F. and one hundred and ten degrees F. and then passing air through the same, which air has been previously heated.

3. The process of treating milk or cream, which consists in heating the same in a substantially closed container to a temperature varying from approximately sixty degrees F., to one hundred and ten degrees F., and then passing heated air therethrough for a short period, which air has preliminarily been heated to a temperature of approximately one hundred and fifty degrees F.

4. The process of treating cream, which consists in heating the same in a substantially closed vessel to bring the same to a uniform temperature and continuing said heating until a slight vapor rises from the surface of the cream, then passing air through the same from distributed points in said vessel for a short period, which air has previously been heated to approximately one hundred and fifty degrees F.

5. The process of treating sour cream containing objectionable matters and odors which consists in heating the same in a substantially closed vessel to a uniform temperature of approximately ninety degrees F., then drawing air therethrough for from two to five minutes, which air has been previously heated to approximately one hundred and fifty degrees F., until the objectionable odors are eliminated.

In testimony whereof I affix my signature.

JOHN T. HANNA.